United States Patent
Li et al.

(10) Patent No.: US 11,238,378 B2
(45) Date of Patent: Feb. 1, 2022

(54) METHOD AND SYSTEM FOR BOOKING TRANSPORTATION SERVICES

(71) Applicant: Beijing Didi Infinity Technology and Development Co., Ltd., Beijing (CN)

(72) Inventors: Lu Li, Beijing (CN); Niping Zhang, Beijing (CN); Dong Guo, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 576 days.

(21) Appl. No.: 15/842,606

(22) Filed: Dec. 14, 2017

(65) Prior Publication Data

US 2019/0057326 A1 Feb. 21, 2019

(30) Foreign Application Priority Data

Aug. 16, 2017 (CN) .......................... 201710703550.3

(51) Int. Cl.
*G06Q 10/02* (2012.01)
*G06Q 30/02* (2012.01)
(Continued)

(52) U.S. Cl.
CPC ......... *G06Q 10/02* (2013.01); *G06Q 30/0206* (2013.01); *G06Q 30/0613* (2013.01); *G06Q 50/30* (2013.01)

(58) Field of Classification Search
CPC ............... G06Q 10/02; G06Q 30/0206; G06Q 30/0613; G06Q 50/30
(Continued)

(56) References Cited

U.S. PATENT DOCUMENTS

2013/0246207 A1 9/2013 Novak et al.
2014/0129302 A1 5/2014 Amin et al.
(Continued)

FOREIGN PATENT DOCUMENTS

CN 103971507 A 8/2014
CN 105160711 A 12/2015
(Continued)

OTHER PUBLICATIONS

"A Hotspot Aware Taxi Zone Queuing System" Published by Department of Information Engineering and Computer Science Chia University in 2015 (Year: 2015).*
(Continued)

*Primary Examiner* — Zeina Elchanti
(74) *Attorney, Agent, or Firm* — Finnegan, Henderson, Farabow, Garrett & Dunner LLP

(57) ABSTRACT

Systems and methods for providing transportation service are disclosed. A method for providing transportation service may include: receiving, from a remote passenger terminal, a transportation service request in an area; receiving, from at least one service vehicle in the area, vehicle information of the at least one service vehicle; assigning, via a processor, the transportation service request to a service queue; determining, via the processor, that the transportation service request qualifies for prioritized processing based on the transportation service request, the vehicle information, and a status of the service queue; and providing, to the remote passenger terminal, an option for prioritized processing.

18 Claims, 7 Drawing Sheets

(51) Int. Cl.
*G06Q 30/06* (2012.01)
*G06Q 50/30* (2012.01)

(58) Field of Classification Search
USPC .......................................................... 705/5
See application file for complete search history.

(56) References Cited

U.S. PATENT DOCUMENTS

| | | | |
|---|---|---|---|
| 2015/0161564 A1 | 6/2015 | Sweeney et al. | |
| 2015/0161752 A1* | 6/2015 | Barreto .......... | G06Q 10/063114 705/7.15 |
| 2015/0317702 A1* | 11/2015 | Liang ..................... | G06Q 10/02 705/5 |
| 2016/0163121 A1* | 6/2016 | Martin .................... | G06Q 10/02 705/13 |
| 2018/0322420 A1* | 11/2018 | Marco ................ | G06Q 30/0284 |

FOREIGN PATENT DOCUMENTS

| | | |
|---|---|---|
| CN | 105184726 A | 12/2015 |
| CN | 105303817 A | 2/2016 |
| CN | 105809263 A | 7/2016 |
| CN | 105825663 A | 8/2016 |
| CN | 105917376 A | 8/2016 |
| CN | 106204937 A | 12/2016 |
| CN | 106846038 A | 6/2017 |
| CN | 106997577 A | 8/2017 |
| WO | WO 2016/112318 A1 | 7/2016 |
| WO | WO 2017/106256 A1 | 6/2017 |

OTHER PUBLICATIONS

International Search Report of PCT Application No. PCT/CN2018/076350, issued by the ISA/CN—State Intellectual Property Office of the P.R. China, dated Apr. 28, 2018.

Written Opinion of the International Searching Authority of PCT Application No. PCT/CN2018/076350, issued by the ISA/CN—State Intellectual Property Office of the P.R. China, dated Apr. 28, 2018.

First Office Action of Chinese Application No. 201710703550.3, dated Aug. 13, 2018.

* cited by examiner ated Aug. 16, 2017, the entire contents of
METHOD AND SYSTEM FOR BOOKING TRANSPORTATION SERVICES

CROSS REFERENCE TO RELATED APPLICATION

The present application is based on and claims the benefits of priority to Chinese Application No. 201710703550.3, filed Aug. 16, 2017, the entire contents of which are incorporated herein by reference.

TECHNICAL FIELD

The present disclosure relates to providing transportation services, and more particularly to, methods and systems for providing arrangement of transportation services.

BACKGROUND

An online hailing platform (e.g., DiDi™ online) can receive a transportation service request from a passenger and then route the service request to at least one transportation service provider (e.g., a taxi driver, a private car owner, or the like). The service request can be answered by a service provider, or assigned to a service provider if no one picks up the service request within a predetermined period.

When the online hailing platform receives transportation service requests beyond what the service vehicles can offer at the current moment (e.g., in rush hours), the transportation service requests can be placed in a queue. The transportation service requests in the queue can be assigned to the service vehicles according to a predetermined regulation. Therefore, in rush hours, a passenger may have to wait in a queue for a long time until his transportation service request is assigned to a vehicle.

Waiting in a queue may waste a passenger's time and complicate his schedule. For example, some passengers may have meetings to attend, planes to catch, or other emergencies (e.g., hospital visits or the like). Embodiments of the present disclosure provide methods and systems that address the aforementioned shortcomings.

SUMMARY

Embodiments of the disclosure provide a computer-implemented method for providing transportation service. The method may include: receiving, from a remote passenger terminal, a transportation service request in an area; receiving, from at least one service vehicle in the area, vehicle information of the at least one service vehicle; assigning, via a processor, the transportation service request to a service queue; determining, via the processor, that the transportation service request qualifies for prioritized processing based on the transportation service request, the vehicle information, and a status of the service queue; and providing, to the remote passenger terminal, an option for prioritized processing.

Embodiments of the disclosure further disclose a system for providing transportation service. The system may include a communication interface. The communication interface may be configured to receive, from a remote passenger terminal, a transportation service request in an area. The communication interface may also be configured to receive, from at least one service vehicle in the area, vehicle information of the at least one service vehicle. The system may further include at least one memory and at least one processor coupled to the communication interface and the at least one memory. The at least one processor may be configured to: assign the transportation service request to a service queue; determine that the transportation service request qualifies for prioritized processing; and provide an option for prioritized processing.

Embodiments of the disclosure further disclose a non-transitory computer-readable medium. The non-transitory computer-readable medium may store a set of instructions, when executed by at least one processor of an electronic device, cause the electronic device to perform a method for providing transport service. The method may include: receiving, from a remote passenger terminal, a transportation service request; determining an area encompassing a location of the remote passenger terminal; receiving, from at least one service vehicle in the area, vehicle information of service providers in the area; assigning the transportation service request to a queue; determining that the transportation service request qualifies for prioritized processing; and providing an option for prioritized processing.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

An aspect of the disclosure is directed to a device for providing transportation service. In some embodiments, the device may be configured to receive a transportation service request from a remote passenger terminal. The device may determine an estimated wait time for the transportation service request to be fulfilled. The device may also determine whether the transportation service request qualifies for prioritized processing. If the transportation service request qualifies for prioritized processing, an option to prioritize the request may be provided to the remote passenger terminal. In some embodiments, the option to prioritize the request may include a prioritization fee. In some embodiments, if the option is accepted (e.g., by a passenger who initiated the transportation service request), the prioritization fee may be collected and allocated to a third party organization (e.g., a charitable organization).

Figure 1:
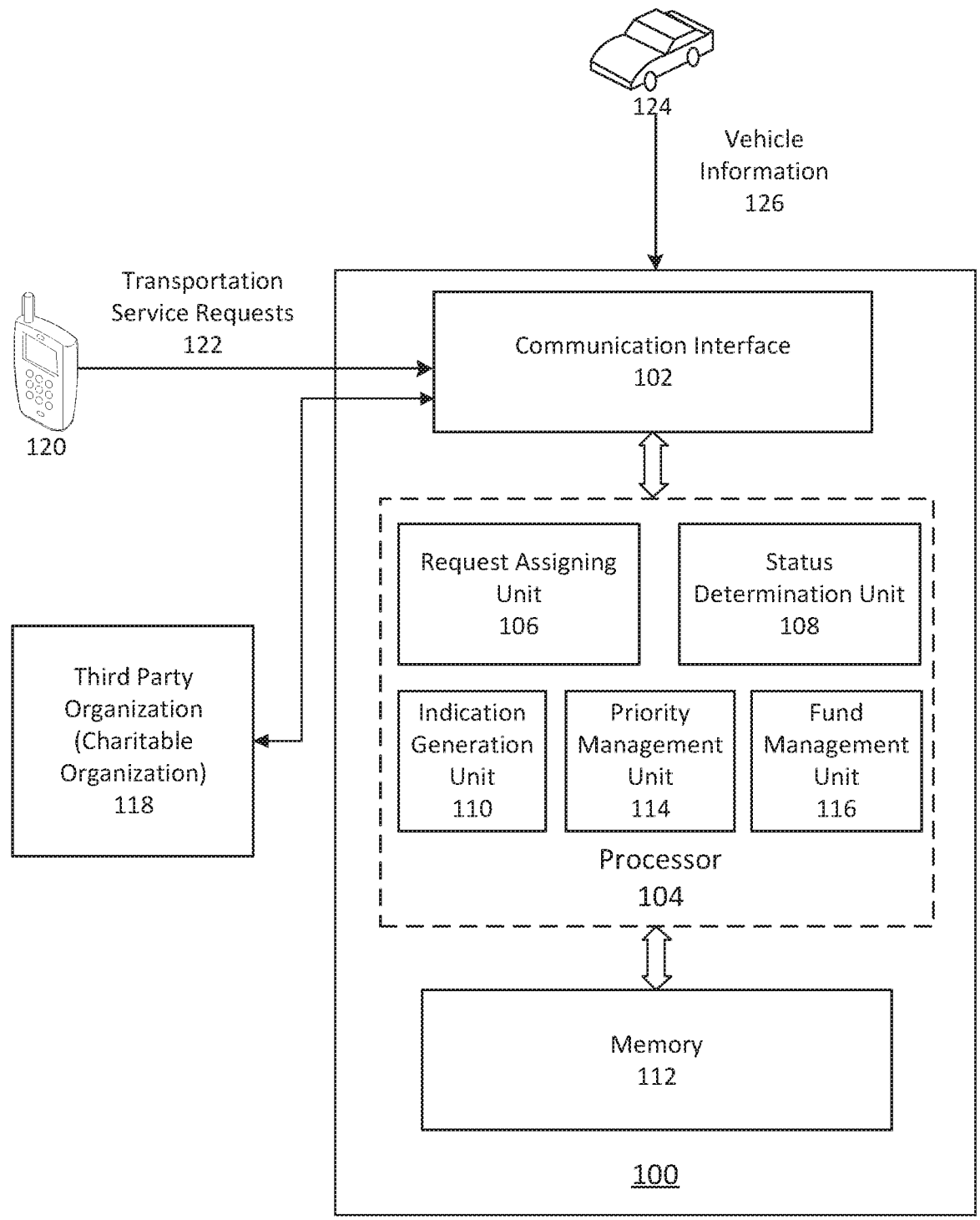
FIG. 1 illustrates a schematic diagram of an exemplary device for providing transportation service, according to embodiments of the disclosure.

FIG. 1 illustrates a schematic diagram of an exemplary device 100 for providing transportation service, according to embodiments of the disclosure.

Device 100 can be a general-purpose server or a proprietary device specially designed for providing transportation service. It is contemplated that, device 100 can be a separate system (e.g., a server) or an integrated component of a server. Because processing transportation service may require significant computation resources, in some embodiments, device 100 may be preferably implemented as a separate system. In some embodiments, device 100 may include sub-systems, some of which may be remote.

In some embodiments, as shown in FIG. 1, device 100 may include a communication interface 102, a processor 104, and a memory 112. Processor 104 may further include multiple modules, such as a request assigning unit 106, a status determination unit 108, an indication generation unit 110, a priority management unit 114, a fund management unit 116, and the like. These modules (and any corresponding sub-modules or sub-units) can be hardware units (e.g., portions of an integrated circuit of processor 104) designed for use with other components or to execute a part of a program. The program may be stored on a computer-readable medium, and when executed by processor 104, it may perform one or more functions. Although FIG. 1 shows units 106, 108, 110, 114, and 116 all within one processor 104, it is contemplated that these units may be distributed among multiple processors located near or remotely with each other. In some embodiments, device 100 may be implemented in the cloud, or on a separate computer/server.

Communication interface 102 may be configured to receive a transportation service request 122 in an area from a remote passenger terminal 120, and receive vehicle information 126 from at least one service vehicle 124 in the area. The remote passenger terminal 120 can be any suitable device that can interact with a passenger, e.g., a smart phone, a tablet, a wearable device, a computer, or the like. Transportation service request 122 can include a current location of the passenger, an origin and a destination of the requested transportation service, a request time, or the like. Generally, the origin of the requested transportation service can be the same as or substantially close to a location of the remote passenger terminal 120. However, it is contemplated that, the origin of the requested transportation can also differ from the location of the remote passenger terminal 120, even if transportation service request 122 is sent from terminal 120. For example, a user can request a transportation service from a computer for his friend, who is distant from this user. Device 100 can generate an estimated price and send the estimated price back to the terminal for displaying to the passenger. Vehicle information 126 of the at least one service vehicle can also be received by communication interface 102. The service vehicles can include taxi cars and private cars enrolled with the online hailing platform. It is contemplated that, the service vehicles can also be autonomous vehicles. Vehicle information 126 can include at least one of locations, capacities, current driving directions, vehicle makers and models, or other features of the service vehicles.

Figure 2:
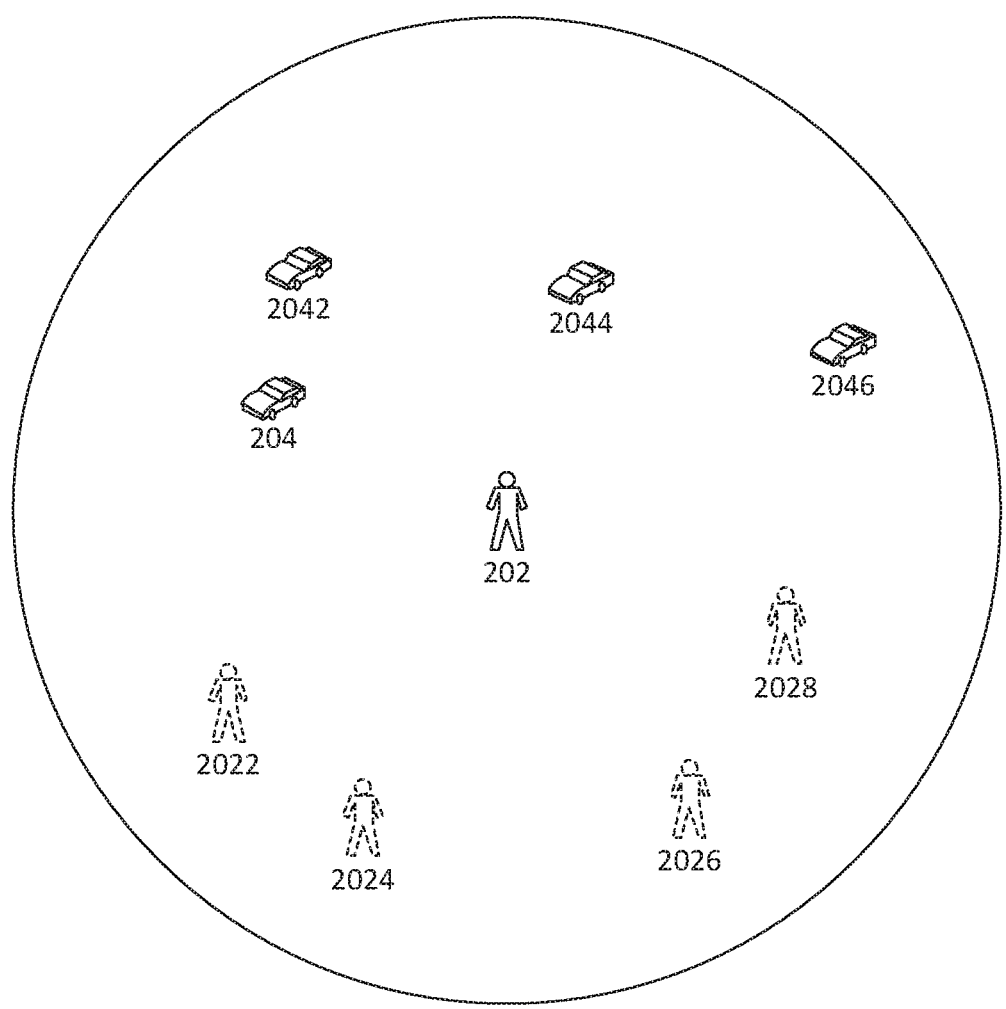
FIG. 2 illustrates passengers and vehicles within an exemplary area, according to embodiments of the disclosure.

In some embodiments, the area can be a predetermined area that is set by device 100. For example, the area can be a hexagonal area that is neighbored with other hexagonal areas. It is contemplated that, the area can contain shapes other than a hexagon. In some embodiments, the area can be an area of shape and size dynamically determined, for example, based on the current location of the remote passenger terminal 120. FIG. 2 illustrates passengers and vehicles within an exemplary area 200, according to embodiments of the disclosure. As shown in FIG. 2, area 200 is a circular area that is centered at the current location of passenger 202. Passengers 2022, 2024, 2026, and 2028 within area 200 also have requested transportation service to device 100 but have not been assigned a vehicle yet. Communication interface 102 of device 100 further receives vehicle information of service vehicles 204, 2042, 2044, and 2046, which are operating in area 200. It is contemplated that, area 200 can also be centered at the origin of the transportation service.

In some embodiments, communication interface 102 can be an integrated services digital network (ISDN) card, cable modem, satellite modem, or a modem to provide a data communication connection. As another example, communication interface 102 can be a local area network (LAN) card to provide a data communication connection to a compatible LAN. Wireless links can also be implemented by communication interface 102. In such an implementation, communication interface 102 can send and receive electrical, electromagnetic or optical signals that carry digital data streams representing various types of information via a network. The network can typically include a cellular communication network, a Wireless Local Area Network (WLAN), a Wide Area Network (WAN), or the like.

Request assigning unit 106 can be configured to assign the transportation service request to a service queue. Before the assignment, request assigning unit 106 may further determine whether queuing should be activated. In some embodiments, when the vehicles in area 200 can provide enough capacities to passengers, the transportation service requests do not have to be queued. In some embodiments, request assigning unit 106 may queue the transportation service requests when the number of transportation service requests exceeds the capacity provided by the service vehicles by a predetermined value, or when the transportation service request is made within a predetermined time range. For example, the predetermined time range can include rush hours (e.g., 8:00-9:00 AM and 5:00-7:00 PM).

In some embodiments, request assigning unit 106 may implement the service queue as a first in first out (FIFO) queue. In this manner, the transportation service requests may be queued according to the order they are received. The request time may be logged to determine the order. For example, a first request having a first request time is queued before a second request having a second request time which is later than the first request time. Accordingly, the first request may be assigned with a service vehicle earlier than the second request. That is, the requests in the service queue may be answered according to their corresponding request times.

Figure 3:
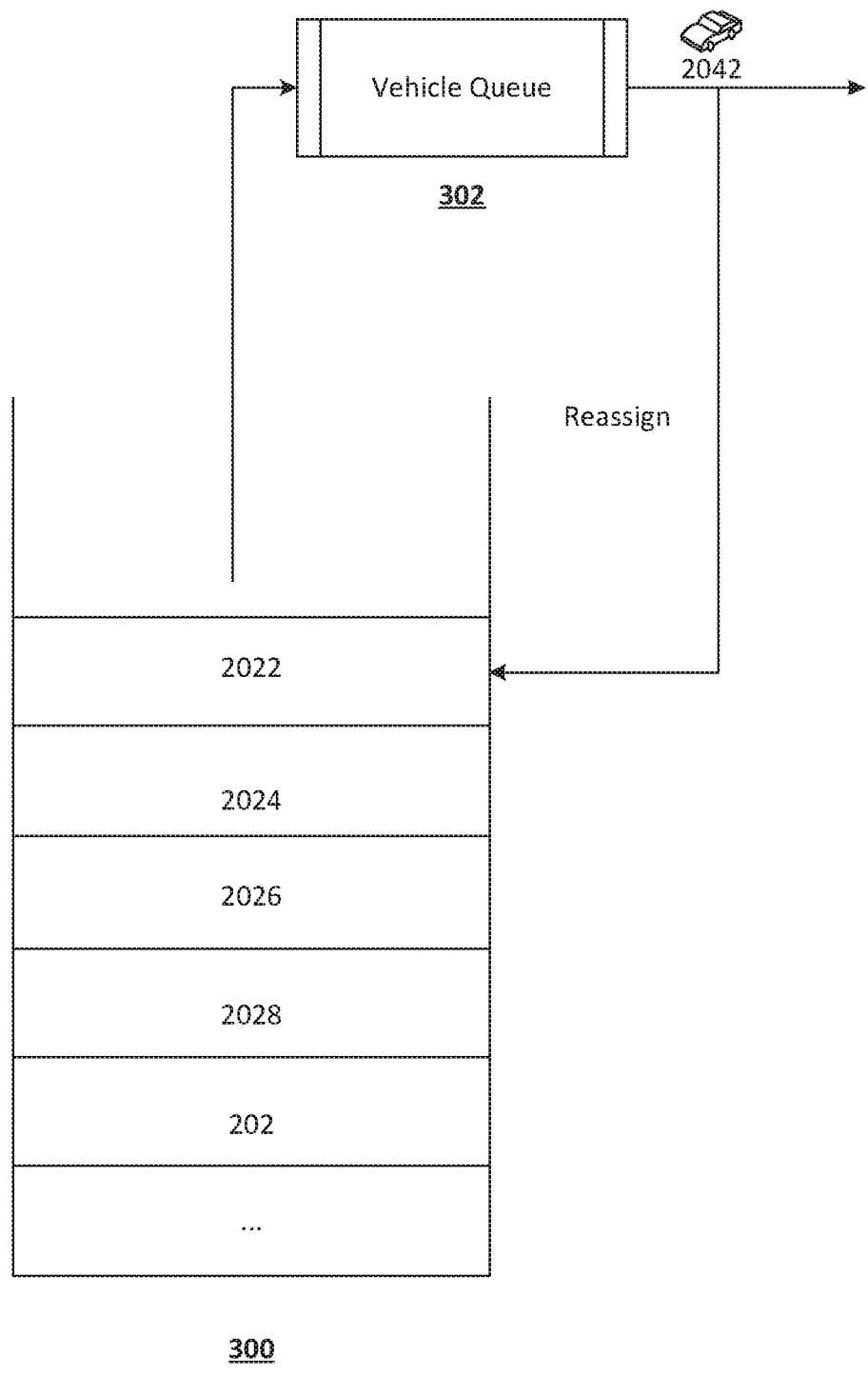
FIG. 3 illustrates an exemplary queue, according to embodiments of the disclosure.

FIG. 3 illustrates an exemplary service queue 300, according to embodiments of the disclosure. Passengers 2022, 2024, 2028, and 202 are placed in service queue 300, with passenger 2022 being the first in line. Separately, available vehicles may form a vehicle queue 302. Service queue 300 and vehicle queue 302 may both be first in first out (FIFO) queues. That is, a vehicle in queue 302 (e.g., vehicle 2042) may be assigned to passenger 2022 first. After that, the next vehicle in queue 302 may be assigned to passenger 2024.

While FIG. 3 depicted only one service queue 300 and one vehicle queue 302, such a depiction is merely exemplary and is not meant to be limiting. In some embodiments, request assigning unit 106 may be configured to utilize different vehicle queues for different types of vehicles. For example, passenger cars may be assigned to a passenger car queue, passenger vans may be assigned to a passenger van queue, and pickup trucks may be assigned to a pickup truck queue. Similarly, request assigning unit 106 may be configured to utilize different service queues for different types of transportation service requests. For example, individual passengers may be assigned to a passenger car service queue, group passengers (e.g., school or tour groups) may be assigned to a passenger van service queue, and passengers needing cargo spaces may be assigned to a pickup truck service queue. The types of vehicles and the types of transportation service requests referenced herein are merely exemplary and are not meant to be limiting. It is contemplated that request assigning unit 106 may be configured to utilize other types of service queues and vehicle queues without departing from the spirit and scope of the present disclosure.

Status determination unit 108 can determine status information of a transportation service request in a service queue based on the transportation service request and the vehicle information. The status information can include at least one of: a number of waiting requests before the transportation service request, an estimated wait time, a total number of requests in the queue, a number of available vehicles in the area (e.g., area 200), and a total number of requests fulfilled within a period of time (e.g., within the last five minutes). The estimated wait time for the transportation service request to be fulfilled can be determined based on the transportation service request, the vehicle information, and a status of the queue. The status information can be displayed to the passengers, allowing the passengers to assess the current traffic condition.

In some embodiments, the estimated wait time for the transportation service request can be determined based on historical data associated with a service queue. For example, status determination unit 108 can determine the estimated wait time using machine learning. The historical data can include sample data and corresponding supervised signal. The sample data can include an origin, a destination, a request time, a location, a position in a waiting queue, a number of previous requests in the waiting queue of a historical request, etc. The supervised signal can include the actual wait time of the historical request. Based on the sample data and the supervised signal, status determination unit 108 can train a machine learning model, which can be further used to estimate the wait time according to features of a transportation service request. It is contemplated that, status determination unit 108 can continuously determine the estimated wait time during the whole queuing process, to periodically update the estimated wait time.

In some embodiments, the estimated time determined by status determination unit 108 may be transmitted to remote passenger terminal 120. In some embodiments, status determination unit 108 can determine a range that the estimated time belongs to and determine a wait time to be displayed to a passenger according to the range. For example, as for an estimated wait time of 1 minute 30 seconds, status determination unit 108 can determine that the estimated wait time belongs to a range of "1-2 minutes," and the wait time according to this range can be displayed as "3 minutes." That is, the wait time may be measured by minutes, and the wait time displayed to a passenger can be greater than the estimated wait time. Similarly, as for another estimated wait time of 2 minute 30 seconds, status determination unit 108 can determine that the estimated wait time belongs to a range of "2-5 minutes," and the wait time according to this range can be displayed as "5 minutes." In some embodiments, an estimated wait time rounded to the next minute can provide better user experience.

Indication generation unit 110 can generate an indication according to the estimated wait time. The indication can include instructions for providing related information to the at least one passenger. For example, the indication can include instructions for displaying the related information on the terminal of the at least one passenger, or include instructions for playing the related information using an audio signal to the at least one passenger.

Figure 4A:
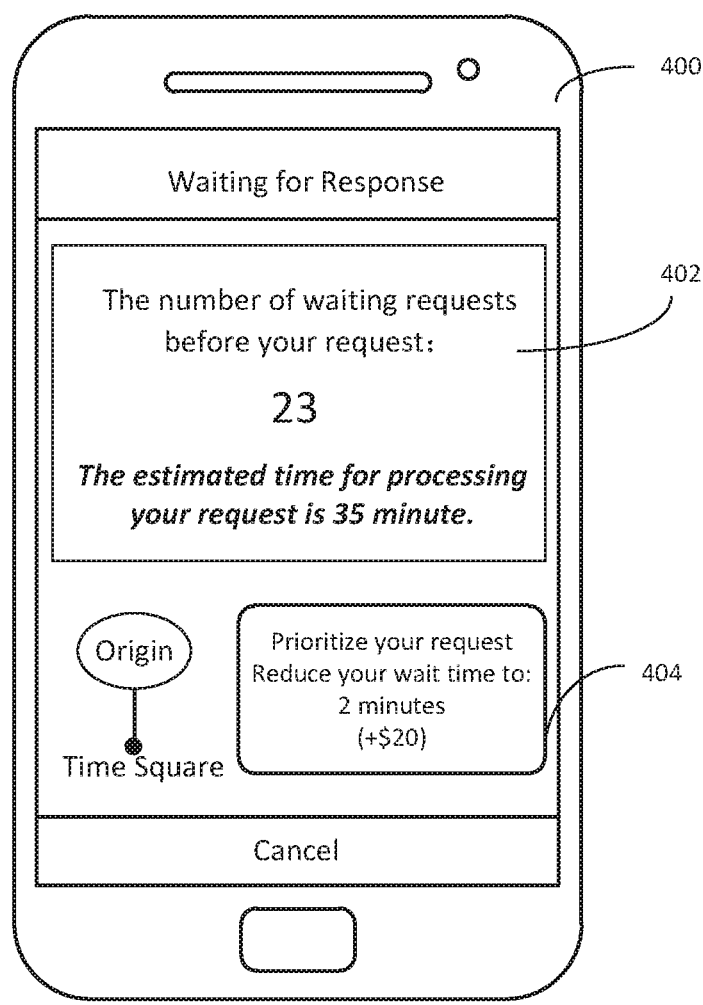
FIG. 4A illustrates an exemplary user interface displayed on a terminal, according to embodiments of the disclosure.

FIG. 4A illustrates an exemplary user interface displayed on a terminal 400, according to embodiments of the disclosure. For example, based on the status information (e.g., the number of waiting requests before the transportation service request in the queue and the estimated wait time) generated by status determination unit 108, indication generation unit 110 may determine that the transportation service request can be fulfilled soon. Generation unit 110 may then provide an indication to terminal 400 that a vehicle is being dispatched to the passenger. Alternatively or additionally, indication generation unit 110 may provide an indication that includes the estimated wait time for display in a status display area 402 of terminal 400.

In some situations, such as during rush hours or special events, the estimated wait time may be significant and the passenger may not be willing to continue the wait. The passenger may choose to cancel the transportation service request. Alternatively, the passenger may be provided with an option to prioritize his transportation service request. In some embodiments, priority management unit 114 may be configured to handle prioritization of transportation service requests.

Specifically, priority management unit 114 may be configured to determine whether a transportation service request qualifies for prioritized processing. Priority management unit 114 may take into consideration the destination, the estimated wait time, the position of the transportation service request within the service queue, as well as status information including, but not limited to, the number of waiting requests before the transportation service request, the total number of requests in the queue, the number of available vehicles, the total number of requests fulfilled within a period of time (e.g., within the last five minutes), and the like. For example, priority management unit 114 may qualify a transportation service request for prioritized processing if the passenger requesting the transportation service meets certain criteria (e.g., senior citizen, expectant mother, premium account holder, or the like). In another example, priority management unit 114 may qualify a transportation service request for prioritized processing if the destination meets certain criteria (e.g., hospital, airport, or the like). In yet another example, priority management unit 114 may qualify a transportation service request for prioritized processing if the number of waiting requests before the transportation service request is greater than a predetermined request number, the estimated wait time is greater than a predetermined wait time, or the total number of requests fulfilled within a period of time is less than a predetermined fulfilling rate. The rules and factors presented above are merely exemplary. It is contemplated that priority management unit 114 may be configured to qualify transportation service requests for prioritized processing based on other types of rules or factors without departing from the spirit and scope of the present disclosure.

In some embodiments, priority management unit 114 may determine that a transportation service request qualifies for prioritized processing for a fee (may be referred to as a prioritization fee). In some embodiments, priority management unit 114 may determine the prioritization fee at least partially based on the characteristics of the service area (e.g., area 200). The characteristics may include, for example, the size of the area, the population of the area, average fare price charged for service in the area, and the like. In some embodiments, the prioritization fee may be a predetermined fixed fee. Alternatively, priority management unit 114 may determine the prioritization fee in real-time based on factors such as traffic condition, the size of the service queue, the estimated wait time, the position of the transportation service request within the service queue, as well as status information including, but not limited to, the number of waiting requests before the transportation service request, the total number of requests in the queue, the number of available vehicles, the total number of requests fulfilled within a given period of time, and the like.

Priority management unit 114 may provide the option to prioritize the transportation service request to the passenger. In some embodiments, priority management unit 114 may provide the option to terminal 400, which may present the option to the passenger in a display area 404. In some embodiments, the option presented in display area 404 may include the prioritization fee associated with the option. In some embodiments, the option presented in display area 404 may also inform the passenger of a new estimated wait time if the passenger chooses to exercise the option to prioritize the transportation service request.

It is contemplated that various techniques may be utilized to determine the new estimated wait time. For instance, priority management unit 114 may arrange prioritized transportation service requests in a priority queue. Priority management unit 114 may utilize techniques similar to that utilized by status determination unit 108 (e.g., for determining the estimated wait time as described above) to determine an estimated priority queue wait time. In some embodiments, the estimated priority queue wait time may be determined based on the transportation service request, the vehicle information, and the status of the priority queue. Other factors may be taken into consideration without departing from the spirit and scope of the present disclosure.

Priority management unit 114 may also be configured to establish more than one priority queue and process prioritized transportation service requests using these priority queues. For example, in some embodiments, priority management unit 114 may maintain two or more vehicle type specific priority queues. Priority management unit 114 may determine estimated priority queue wait times for some or all of the priority queues. The estimated priority queue wait times may then be presented to the passenger. The passenger may specify which priority queue he wants to join. Suppose, for illustrative purposes, that the passenger initially requested a passenger car, but upon realizing that joining the priority queue for passenger vans may reduce more wait time compared to joining the priority queue for passenger cars, the passenger may choose to join the priority queue for passenger vans instead.

In another example, priority management unit 114 may be configured to establish priority queues in multiple tiers and process the prioritized transportation service requests using the multiple tiers of priority queues. The passenger may be presented with an option to pay a prioritization fee of, for example, $20, to join a first tier priority queue. The passenger may also be presented with an option to pay a higher prioritization fee to join a second tier priority queue. The second tier priority queue may be smaller in size, and may therefore have a shorter wait time compared to the first tier priority queue.

Whether priority management unit 114 maintains one priority queue or multiple priority queues may be determined based on various factors. For example, if the service area covers a large city, it may be desirable for priority management unit 114 to maintain multiple priority queues. Other factors may be taken into consideration as well in determining specific implementations of the priority management unit 114.

Figure 4B:
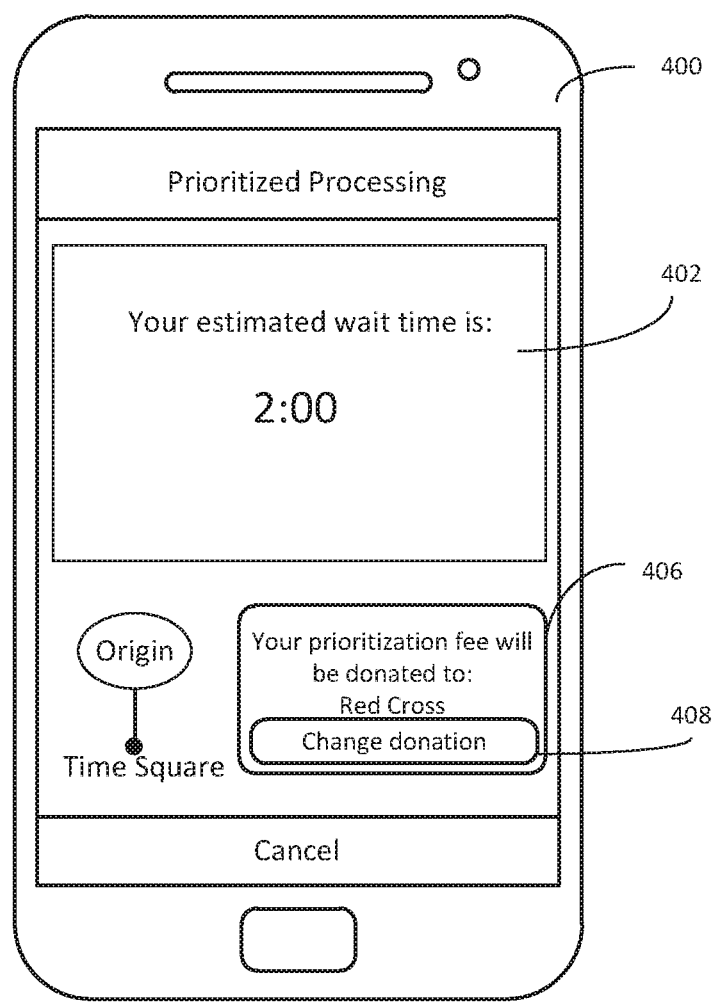
FIG. 4B illustrates another exemplary user interface displayed on a terminal, according to embodiments of the disclosure.

Referring back to FIG. 4A, suppose that the passenger has reviewed the option presented in display area 404 and decided to accept the option, the acceptance may be communicated to priority management unit 114. Once the acceptance is received, priority management unit 114 may assign the transportation service request to a priority queue and update the estimated wait time in status display area 402 to reflect the new wait time (i.e., the estimated priority queue wait time). FIG. 4B illustrates an exemplary user interface displayed after the acceptance is received.

It is noted that the acceptance of the option may include a payment of (or a commitment to pay) the prioritization fee associated with the option. In some embodiments, at least a portion of the prioritization fee may be allocated to third party organizations (e.g., charitable organizations) 118 (shown in FIG. 1). In some embodiments, the allocation of the prioritization fee may be managed by a fund management unit 116 (shown in FIG. 1).

In some embodiments, fund management unit 116 may provide the name of the third party organization to the passenger for review. Specifically, fund management unit 116 may provide the name of the third party organization to terminal 400, which may present the name of the third party organization in a display area 406. In some embodiments, the third party organization may be an organization specified by fund management unit 116. Alternatively, fund management unit 116 may provide a list of preapproved third party organizations to the passengers, allowing the passengers to select one or more organizations that will receive at least some portions of their prioritization fees. Additionally, fund management unit 116 may allow the passengers to change or specify their own third party organizations. For example, a button 408 is provided on the user interface of FIG. 4B for the user to press and another user interface (not shown) may be loaded for the user to specify other donation organizations. It is to be understood that specific implementations of the user interface may vary without departing from the scope and spirit of the present disclosure.

In some embodiments, fund management unit 116 may provide an interface (e.g., a mobile phone application or a website) that can interact with passengers, drivers, members of the public, or various other types of entities (may be referred to collectively as users) to setup fund management with one or more third party organizations. For example, users may use the interface to nominate (or vote for) third party organizations that may receive portions of prioritization fees. Third party organizations may also use the interface to nominate (or solicit support for) themselves to receive portions of prioritization fees. Fund management unit 116 may select some of the third party organizations having received votes above a certain threshold as preapproved third party organizations. Fund management unit 116 may also allow supervision of the selection process. For example, management of the company providing the online hailing platform may utilize the fund management unit 116 to selectively approve or disapprove third party organizations based on certain established criteria (e.g., reputations, social responsibilities, or other objectives).

Fund management unit 116 may also provide an interface (e.g., a mobile phone application or a website) that can interact with approved third party organizations to setup account and payment information. In some embodiments, fund management unit 116 may be equipped with payment processing abilities and may store the account information locally or at a secure location. In some embodiments, fund management unit 116 may reference approved third party organizations to an online payment system that supports online money transfers. In this manner, fund management unit 116 may transfer money to third party organizations through the online payment system. In some embodiments, fund management unit 116 may transfer money to a particular third party organization every time a prioritization fee (that specifies the particular third party organization as the receiving third party organization) is collect. Alternatively, fund management unit 116 may keep track of the amount each third party organization is collecting, and periodically (e.g., weekly, monthly, quarterly, etc.) transfer the money to each third party organization. In some embodiments, money may be transferred using various types of permissible electronic funds transfer methods. In some embodiments, fund management unit 116 may also setup one or more trust, or other types of financial instruments to help manage the funds without departing from the spirit and scope of the present disclosure.

Figure 4C:
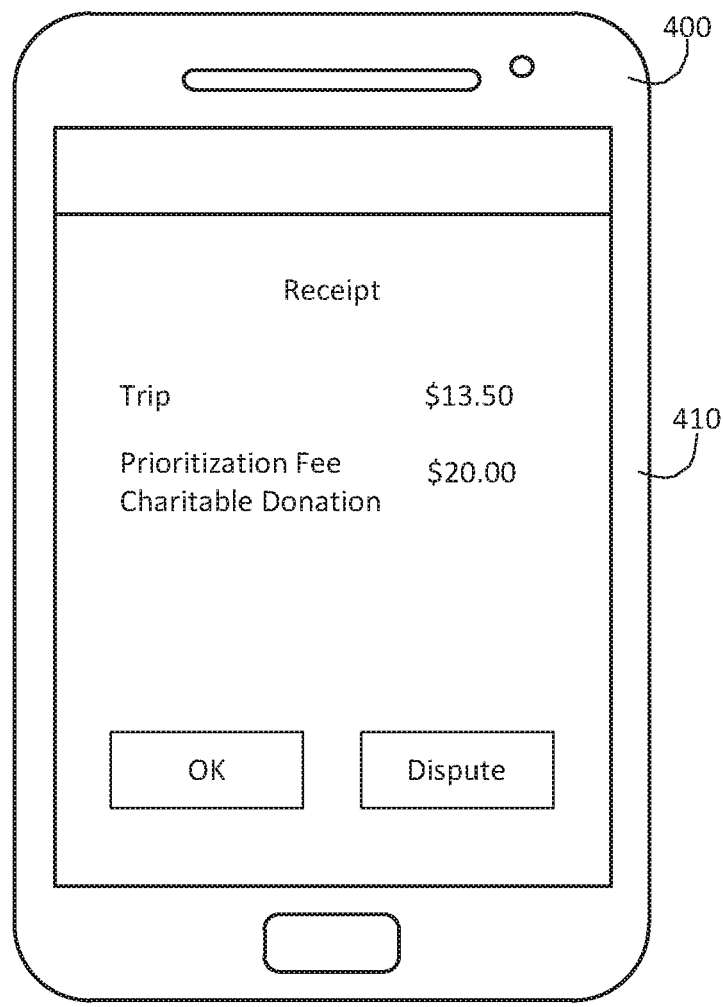
FIG. 4C illustrates yet another exemplary user interface displayed on a terminal, according to embodiments of the disclosure.

FIG. 4C is an illustration depicting a receipt 410 that may be displayed upon completion of the transportation service request. It is noted that the prioritization fee may be listed as a separate charge on receipt 410. It is also noted that if the third party organization receiving the prioritization fee is a charitable organization, the prioritization fee may be indicated as a charitable donation. In some embodiments, the charitable organization's name may be displayed. In some embodiments, the user may also choose whether to inform the third party organization of the identity of the user. The user may therefore have the option to remain anonymous or a named donor based on user preference. The user may also choose whether to disclose certain demographic information about the user to the third party organization. Demographic information may include, but not limited to, age group, income level, profession, and the like. Such demographic information may help third party organizations improve their understanding of the donor structure.

It is to be understood that the user interfaces depicted in FIGS. 4A-4C are merely exemplary and are not meant to be limiting. It is contemplated that other types of user interfaces may be utilized for showing other types of information. For instance, user interfaces may be provided to allow the passengers to view their contributions to particular charitable organizations individually or collectively. Other user interfaces may be provided to support passenger review of particular charitable organizations, make modifications to their selections and account settings, dispute incorrect charges, and the like.

Figure 5:
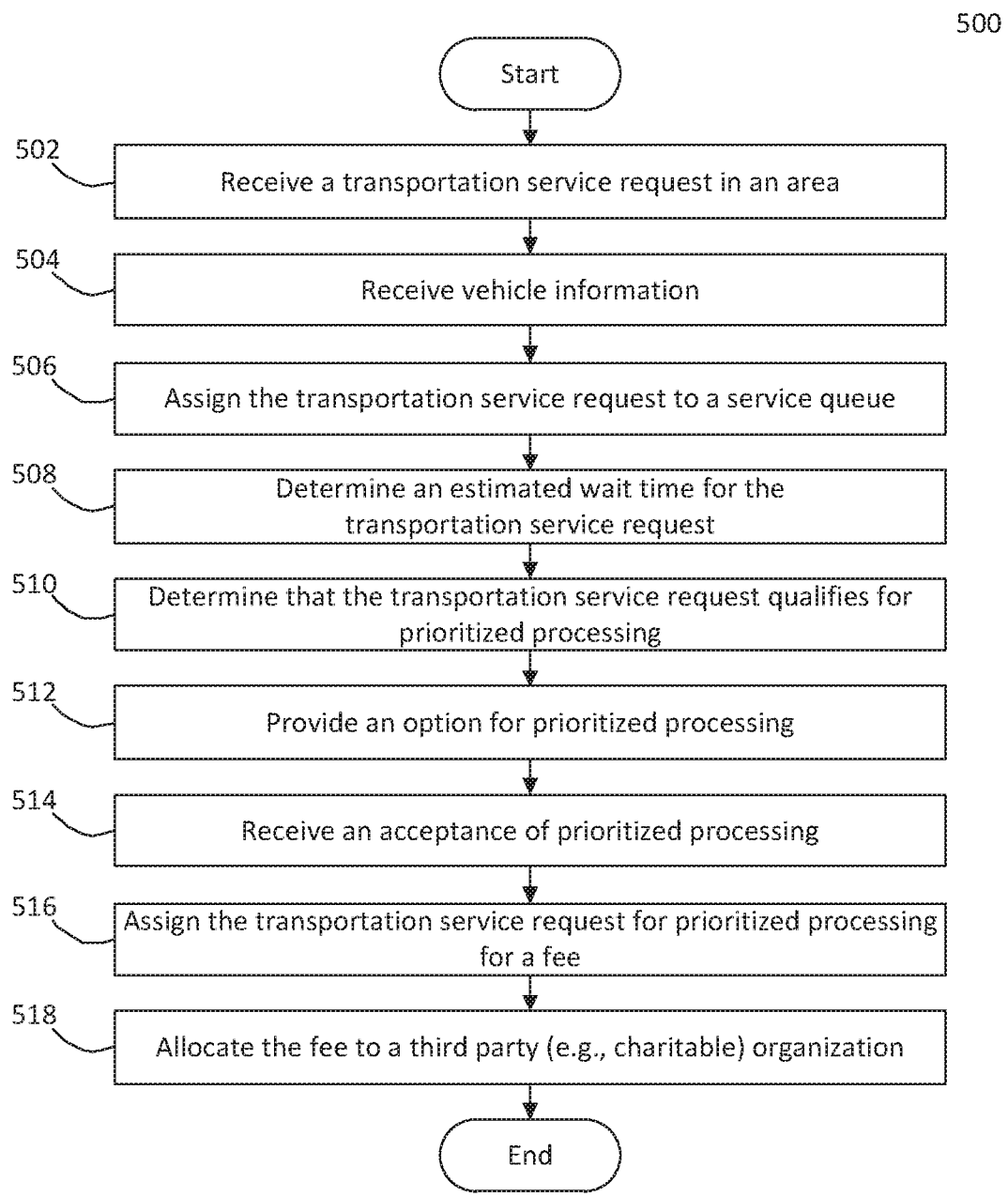
FIG. 5 illustrates a flowchart of an exemplary method for providing transportation service, according to embodiments of the disclosure.

Another aspect of the disclosure is directed to a method for providing transportation service. FIG. 5 is a flowchart illustrating an exemplary method 500 for providing transportation service consistent with disclosed embodiments. Method 500 may be implemented by device 100 including at least one processor, and method 500 may include steps 502-518 as described below.

In step 502, device 100 may receive a transportation service request in an area from a remote passenger terminal. In step 504, device 100 may receive vehicle information of at least one service vehicle from the at least one service vehicle in the area. The transportation service request can include a current location of the passenger, an origin and a destination of the requested transportation service, or the like. Device 100 can generate an estimated price and send the estimated price back to the passenger. The vehicle information can include at least one of locations, capacities, current driving directions, vehicle models or other features of the service vehicles.

In some embodiments, the area can be a predetermined area that is set by device 100. For example, the area can be a hexagonal area that is neighbored with other hexagonal areas. In some embodiments, the area can be a dynamic area associated with the current location of the passenger.

In step 506, device 100 may assign the transportation service request to a service queue. Before the assignment, device 100 may further determine whether queuing should be activated. In some embodiments, device 100 may queue the transportation service request when the number of the transportation service request exceeds the capacity provided by the service vehicles by a predetermined value, or when the transportation service request is made within a predetermined time range. The predetermined time range can be rush hours (e.g., 8:00-9:00 AM and 5:00-7:00 PM).

In step 508, device 100 may determine status information of a transportation service request in the service queue based on the transportation service request and the vehicle information. The status information may include an estimated wait time. The estimated wait time may be determined based on the transportation service request, the vehicle information, and a status of the queue. The status information may be presented to the passengers, allowing the passengers to assess the current traffic condition.

In step 510, device 100 may determine whether the transportation service request qualifies for prioritized processing. Device 100 may take into consideration the destination, the estimated wait time, the position of the transportation service request within the service queue, as well as status information including, but not limited to, the number of waiting requests before the transportation service request, the total number of requests in the queue, the number of available vehicles, the total number of requests fulfilled within a period of time (e.g., within the last five minutes), and the like. For example, device 100 may qualify a transportation service request for prioritized processing if the passenger requesting the transportation service meets certain criteria (e.g., senior citizen, expectant mother, premium account holder, or the like). In another example, device 100 may qualify a transportation service request for prioritized processing if the destination meets certain criteria (e.g., hospital, airport, or the like). In still another example, device 100 may qualify a transportation service request for prioritized processing if the number of waiting requests before the transportation service request is greater than a predetermined request number, the estimated wait time is greater than a predetermined wait time, or the total number of requests fulfilled within a period of time is less than a predetermined fulfilling rate. It is contemplated that device 100 may qualify transportation service requests for prioritized processing based on other types of rules or factors without departing from the spirit and scope of the present disclosure.

In step 512, device 100 may provide an option to prioritize the transportation service request to the passenger. In some embodiments, device 100 may provide the option to the remote passenger terminal, which may present the option to the passenger using a display. In step 514, device 100 may receive, from the remote passenger terminal, an acceptance of the option to prioritize processing of the transportation service request. In step 516, device 100 may assign the transportation service request for prioritized processing.

In some embodiments, the option to prioritize the transportation service request may include a prioritization fee. The acceptance of the option may therefore include a payment (or a commitment to pay) the prioritization fee. In such embodiments, method 500 may include step 518 configured to allocate at least a portion of the prioritization fee to one or more third party organizations. In some embodiments, the third party organization(s) may be charitable organization(s) specified by device 100. Alternatively, device 100 may provide a list of preapproved third party organizations to the passengers, allowing the passengers to select one or more organizations that will receive at least some portions of their prioritization fees. Additionally, device 100 may provide a user interface that allows the passengers to change or specify their own third party organizations. It is to be understood that specific implementations of the user interface may vary without departing from the scope and spirit of the present disclosure.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A computer-implemented method for providing transportation service, comprising:
  receiving, from a plurality of remote passenger terminals, a plurality of transportation service requests;
  dynamically determining an area based on current locations of the plurality of remote passenger terminals;
  receiving, from a plurality of service vehicles in the area, vehicle information of the plurality of service vehicles;
  assigning, via a processor, the plurality of transportation service requests to a service queue;
  determining, via the processor, whether each particular transportation service request of the plurality of transportation service requests qualifies for prioritized processing based on a position of the particular transportation service request within the service queue, the vehicle information of the plurality of service vehicles, and a status of the service queue;
  in response to a determination that the particular transportation service request qualifies for the prioritized processing, providing an instruction to a particular remote passenger terminal that submitted the particular transportation service request to display, on a user interface of the particular remote passenger terminal, a first option to pay a first prioritization fee to join a first tier priority queue and a second option to pay a second and higher prioritization fee to join a second tier priority queue, the second tier priority queue being smaller in size and having shorter wait time compared to the first tier priority queue;
  receiving, from the particular remote passenger terminal, an acceptance of one of the first option and the second option; and
  assigning, via the processor, the particular transportation service request to one of the first tier priority queue and the second tier priority queue based on the received acceptance.

2. The method of claim 1, further comprising:
  determining, via the processor, an estimated wait time for the particular transportation service request to be fulfilled based on the position of the particular transportation service request within the service queue, the vehicle information of the plurality of service vehicles, and the status of the service queue;
  wherein determining the particular transportation service request qualifies for the prioritized processing is based on at least one of the estimated wait time, the status of the service queue, and the position of the particular transportation service request within the service queue.

3. The method of claim 1, wherein the prioritization fee is predetermined at least partially based on one or more characteristics of the area.

4. The method of claim 1, wherein the prioritization fee is determined at least partially based on traffic information, a size of the service queue, and the position of the particular transportation service request within the service queue.

5. The method of claim 1, further comprising:
  allocating, via the processor, the prioritization fee to a third party organization.

6. The method of claim 5, wherein the third party organization is a charitable organization.

7. The method of claim 5, wherein the third party organization is specified by the user through the particular remote passenger terminal.

8. The method of claim 5, wherein the third party organization is selected from a list of preapproved third party organizations.

9. The method of claim 1, further comprising:
  determining an estimated priority queue wait time for the particular transportation service request to be fulfilled based on the particular transportation service request, the vehicle information of the plurality of service vehicles, and a status of the priority queue; and
  providing the estimated priority queue wait time to the particular remote passenger terminal.

10. The method of claim 1, further comprising:
  assigning the transportation service request to a plurality of vehicle type specific priority queues;
  determining estimated wait times for the vehicle type specific priority queues based on the transportation service request, the vehicle information, and statuses of the vehicle type specific priority queues; and
  providing the estimated wait times for the vehicle type specific priority queues to the remote passenger terminal.

11. A device for providing transportation service, comprising:
  a communication interface configured to
  receive, from a plurality of remote passenger terminals, a plurality of transportation service requests in an area;

receive, from a plurality of service vehicles in the area, vehicle information of the plurality of service vehicles;

at least one memory; and at least one processor coupled to the communication interface and the at least one memory, the at least one processor being configured to:

dynamically determine the area based on current locations of the plurality of remote passenger terminals;

assign the plurality of transportation service requests to a service queue;

determine whether each particular transportation service request of the plurality of transportation service requests qualifies for prioritized processing;

in response to a determination that the particular transportation service request qualifies for the prioritized processing, provide an instruction to a particular remote passenger terminal that submitted the particular transportation service request to display, on a user interface of the particular remote passenger terminal, a first option to pay a first prioritization fee to join a first tier priority queue and a second option to pay a second and higher prioritization fee to join a second tier priority queue, the second tier priority queue being smaller in size and having shorter wait time compared to the first tier priority queue;

receive, from the particular remote passenger terminal, an acceptance of one of the first option and the second option; and assign the particular transportation service request to one of the first tier priority queue and the second tier priority queue based on the received acceptance.

12. The device of claim 11, wherein the processor is configured to determine an estimated wait time for the particular transportation service request to be fulfilled based on a position of the particular transportation service request within the service queue, the vehicle information of the plurality of service vehicles, and a status of the service queue; and determine the particular transportation service request qualifies for the prioritized processing based on at least one of the estimated wait time, the status of the service queue, and the position of the particular transportation service request within the service queue.

13. The device of claim 11, wherein the prioritization fee is determined at least partially based on at least one of characteristics of the area, traffic information, a size of the service queue, and a position of the particular transportation service request within the service queue.

14. The device of claim 13, wherein the at least one processor is further configured to:

allocate the prioritization fee to a third party organization.

15. The device of claim 14, wherein the third party organization is specified by the user through the particular remote passenger terminal or is selected from a list of preapproved third party organizations.

16. The device of claim 11, wherein the at least one processor is further configured to:

determine an estimated priority queue wait time for the particular transportation service request to be fulfilled based on the particular transportation service request, the vehicle information of the plurality of service vehicles, and a status of the priority queue; and provide the estimated priority queue wait time to the particular remote passenger terminal.

17. The device of claim 11, wherein the at least one processor is further configured to:

assign the transportation service request to a plurality of vehicle type specific priority queues;

determine estimated wait times for the vehicle type specific priority queues based on the transportation service request, the vehicle information, and statuses of the vehicle type specific priority queues; and provide the estimated wait times for the vehicle type specific priority queues to the remote passenger terminal.

18. A non-transitory computer-readable medium that stores a set of instructions that, when executed by at least one processor of an electronic device, cause the electronic device to perform a method for providing transport service, the method comprising:

receiving, from a plurality of remote passenger terminals, a plurality of transportation service requests;

dynamically determining an area based on current locations of the plurality of remote passenger terminals;

receiving, from a plurality of service vehicles in the area, vehicle information of the plurality of service vehicles;

assigning the plurality of transportation service requests to a service queue;

determining whether each particular transportation service request of the plurality of transportation service requests qualifies for prioritized processing;

in response to a determination that the particular transportation service request qualifies for the prioritized processing, providing an instruction to a particular remote passenger terminal that submitted the particular transportation service request to display, on a user interface of the particular remote passenger terminal, a first option to pay a first prioritization fee to join a first tier priority queue and a second option to pay a second and higher prioritization fee to join a second tier priority queue, the second tier priority queue being smaller in size and having shorter wait time compared to the first tier priority queue;

receiving, from the particular remote passenger terminal, an acceptance of one of the first option and the second option; and assigning the particular transportation service request to one of the first tier priority queue and the second tier priority queue based on the received acceptance.

* * * * *